(12) United States Patent
Jalili

(10) Patent No.: US 6,209,104 B1
(45) Date of Patent: Mar. 27, 2001

(54) SECURE DATA ENTRY AND VISUAL AUTHENTICATION SYSTEM AND METHOD

(76) Inventor: Reza Jalili, 32 W. 40 St., New York, NY (US) 10018

(*) Notice: Subject to any disclaimer, the term of this patent is extended or adjusted under 35 U.S.C. 154(b) by 0 days.

(21) Appl. No.: 08/980,748

(22) Filed: Dec. 1, 1997

Related U.S. Application Data

(60) Provisional application No. 60/033,126, filed on Dec. 10, 1996.

(51) Int. Cl.[7] .................................................. H04L 9/00
(52) U.S. Cl. ........................ 713/202; 340/825.34; 705/44
(58) Field of Search .................................. 713/202, 200, 713/201, 183, 184; 382/115, 123; 340/825.34; 380/2.3, 2.4, 2.5; 364/479.07; 705/18, 44, 72; 345/348, 349

(56) References Cited

U.S. PATENT DOCUMENTS

| | | | |
|---|---|---|---|
| 5,276,314 | * 1/1994 | Martino et al. ....................... | 235/380 |
| 5,428,349 | * 6/1995 | Baker ................................. | 340/825.3 |
| 5,465,084 | * 11/1995 | Cottrell ............................. | 340/825.31 |
| 5,559,961 | * 9/1996 | Blonder ............................. | 713/202 |
| 5,608,387 | * 3/1997 | Davies .............................. | 340/825.34 |
| 5,664,099 | * 9/1997 | Ozzie et al. ........................ | 713/200 |
| 5,754,785 | * 5/1998 | Lysik et al. ........................ | 395/200.52 |
| 5,764,913 | * 6/1998 | Jancke et al. ....................... | 395/200.54 |
| 5,821,933 | * 10/1998 | Keller et al. ........................ | 345/348 |

OTHER PUBLICATIONS

*What is keyword.com?* (visited Jul. 21, 1997) <http://www.keyword.com/whatis.htm>.
*Keyword Frequently Asked Questions* (visited Jul. 21, 1997) <http://www.keyword.com/faqs.htm>.
*Press Coverage* (visited Jul. 21, 1997) <http://www.keyword.com/press.htm>.
*What are Networds?* (visited Jul. 1, 1997) <http://www.netword.com/n/help/what.html>.
*Facts About Networds* (visited Jul. 1 1997) <http://www.netword.com/n/help/more.html>.
*Networds in Advertising* (visited Jul. 1, 1997) <http://www.netword.com/n/help/nwinads.html>.
*Constructing a Netword* (visited Jul. 1,1997) <http://www.netword.com/n/help/construct.html>.
*What is a Personal Information Page?* (visited Jul. 1, 1997) <http://www.netword.com/n/accounts/pips.html>.

* cited by examiner

Primary Examiner—Robert W. Beausoliel, Jr.
Assistant Examiner—Scott T. Baderman
(74) Attorney, Agent, or Firm—Skadden, Arps, Slate, Meagher & Flom LLP

(57) ABSTRACT

The present invention is a secure data entry and visual authentication system that allows a user to securely input and communicate data, including passwords. The system includes a client subsystem (100), a server subsystem (200) and a communication subsystem (300). Server subsystem (200) generates a pseudorandomly arranged display image (250) including a plurality of icons associated with data, and transmits said display image to client subsystem (100) for display on a display device (104). A user consecutively selects at least one said icons corresponding to data desired to be input. Selected icon location information for those selected icons is communicated by client subsystem (100) to server subsystem (200), which then compares that selected icon location information to icon location information and associated data stored in memory (210) to ascertain the data input by the user.

31 Claims, 11 Drawing Sheets

SECURE DATA ENTRY AND VISUAL AUTHENTICATION SYSTEM AND METHOD

CROSS-REFERENCE TO RELATED APPLICATION

This application is based on and claims priority from U.S. Provisional Patent Application Ser. No. 60/033,126 filed on Dec. 10, 1996.

FIELD OF THE INVENTION

The present invention is directed generally to a secure data entry and visual authentication system and, in particular, to a system and method that allows secure data and/or password entry to computer-based systems, such as for example, networked computer systems, automated teller machines ("ATMs"), online banking, calling card phone access, shopping and other information services.

BACKGROUND OF THE INVENTION

Systems are known that are designed to allow secure data entry and access to computer systems, ATMs, online services, and the like. For example, in an office computer environment with access to a computer network such as a wide area network ("WAN") or a local area network ("LAN"), access by individual users to the computer network is often controlled by a password entry system. Such systems usually involve identifying the user to the network such as by entering the user's name or initials (often referred to as the "user ID"), and then entering a multi-digit alphanumeric password for that user. Entry of the user ID and password typically involves typing the alphanumeric characters that comprise the user ID or password. If the correct password corresponding to the identified user is entered, the user will be signed on to the network and allowed access, as appropriate.

In online applications, a user may seek to obtain access to a secure networked resource, such as a World Wide Web ("Web") site on the Internet or other online service, in order to access online banking services or other information subject to restricted access. Additionally, a user might wish to shop for and purchase a product or service available via a Web site. In these online services examples, after the user is properly identified, an alphanumeric code or personal identification number ("PIN") usually must be entered. If the code or PIN is correct, access will be granted. The online shopping example also presents another situation requiring secure data entry. There, a user may desire to enter a credit card number or similar information to make a purchase.

In an ATM system, a user typically will be provided with a card having a readable magnetic strip which identifies the user to the ATM network. A personal identification number, or PIN, must be entered by the user as the password in order to gain access to the user's account. The PIN is generally entered by a user through a numeric keypad. Once the PIN is verified, access to the user's bank accounts, including the withdrawal of cash, is permitted. Similarly, a person using a calling card on a payphone will enter his or her account number and PIN to place a phone call.

Systems such as the ones described above are susceptible to being compromised by the theft of, or otherwise unapproved access to, passwords and PINs. Online shopping applications are equally susceptible to having information such as credit card numbers pilfered. Two security problems for password and other data entry systems are the "over-the-shoulder" problem and "interception." The over-the-shoulder problem refers to the fact that direct keyboard entry of passwords and other data is susceptible to ready observation by a third party. This is particularly troublesome for ATMs, calling card operated phones and other systems which require the entry of passwords or other sensitive information in a public environment.

The "interception" problem refers to the fact passwords and other data are also susceptible to compromise during their transmission over computer networks. There are numerous cryptographic techniques known in the prior art for encrypting data to deter the unauthorized disclosure thereof if data is captured. Even with the use of encryption, however, the code can be broken or deciphered, the password can be learned, and the system can then be broken into. Moreover, increases in computing capabilities make encryption techniques susceptible to computational decryption techniques. In any event, once the user identification and password are obtained, illegal access to a given restricted resource may be readily gained by a third party. Additionally, various computer-based "observation" techniques are known for determining passwords. For example, a trojan horse program running on a user's computer can present an interface familiar to a user while stealthily recording that user's password without detection.

Various proposals have been suggested for other than alphanumeric entry of the password on a keyboard or pad. For example, Davies U.S. Pat. No. 5,608,387 proposes a system whereby slightly differing complex facial expressions or appearances in a matrix displayed on a screen are recognized visually by an authorized user to select a visually recognized facial image which represents the password. Davies addresses the over-the-shoulder problem by relying on the human ability to distinguish complex, subtle differences in facial expressions. Unlike Davies, the present invention does not require either complex images or false images. Additionally, it does not require that particular images be associated with each user.

Cottrell U.S. Pat. No. 5,465,084 also addresses the over-the-shoulder problem. Cottrell describes a system whereby a user is presented with a blank grid and selects a pattern of letters on a screen. This pattern is compared with a stored master pattern to determine whether a proper match of the pattern has been entered. Cottrell relies on the vast number of combinations possible by making positioning of password characters in more than one dimension and the color of the data elements possible components of the password. Cottrell requires that password characters be entered in a grid pattern.

Baker U.S. Pat. No. 5,428,349 is directed to a password entry system in which the password is embedded in various columns and rows which are then selected to indicate the password. In a representative embodiment of that invention, a user picks a six character column out of six such columns displayed on a screen that contains the proper character of a password. This is done for each character of the password. In this way, Baker provides deterrence against third party observation of the password and provides transmission protection. However, Baker is limited to always using an m×n grid, requires the user to select an entire column or row, and is subject to a logical deduction to a possible set of passwords.

Note also that Davies, Cottrell and Baker all are limited to a password entry function. None of the three may be used to provide a secure general data entry function whereby any data can be entered and transmitted.

What is needed is a system that is at once user-friendly, not readily susceptible to observation during data entry, and resistant to interception and computational deciphering techniques.

SUMMARY OF THE INVENTION

The present invention is directed to a method and system of secure data entry. In one embodiment of the present invention, the system includes a server subsystem capable of generating display images containing icons and having a memory which stores location information for the icons in each said display image as well as data associated with each icon, and a client subsystem including a display device on which the generated display images are displayed, randomly or otherwise. An input device connected to the client subsystem is used by a user to select at least one of said icons by selecting points on or proximate to the icons. A communications subsystem transmits this selected icon location information from the client subsystem to the server subsystem, and comparator functionality in the server subsystem compares the selected icon location information with the icon location information and associated data stored in the server subsystem to identify the data that was originally input by the user. The server subsystem is thus able to determine the input data that the user input into the client subsystem without directly exposing that data to observation or interception.

Under the method according to one aspect of the present invention, a user desiring access to a password-protected resource identifies himself to a computer-based resource server by entering a user ID, such as a name or initials, at a local node or other such client subsystem, such as the user's personal computer ("PC"), the PC being connected to the computer-based resource server by means of a computer network. If the server recognizes the user, the data elements that constitute the user's predetermined password, known to the user, is retrieved and displayed on the user's PC monitor in a display image containing icons in random order. The icons are associated with data in a way that is readily or intuitively discernable by the user. For example, instead of having a user input keypad digit "5" for the number 5 in a password, an icon consisting of 5 bowling pins together could appear on a display image (a commensurate number of bowling pins would be grouped in the icon corresponding to digit 0 through 9). A user would intuitively be able to determine that the five grouped bowling pins in said icon corresponds to the number "5" and, in a touch-screen application, for example, would touch that icon in order to input "5."

The user selects the various icons associated with the alphanumeric characters making up the user's password. Location information associated with the selected icons—but not the actual password elements—is then communicated to the resource server. The selected icon location information may refer to specific points or to specific areas on the display image. The selection of any point within an area corresponding to a particular icon will result in the selection of that icon. The server then implements a comparator function which translates the selected icon location information into the alphanumeric characters represented by the selected icon location information and determines whether the user's password has been properly entered. If so, the user is allowed appropriate access to the password-protected resource.

In this fashion, the user's data in the above example, the password, is protected from theft during entry, as well as protected from interception during transmission. The data is protected during entry from thieves who observe touch screen keypad entry by varying the nature and locations of icons on the display as well as the correspondence between icons and keypad digits (in those implementations that use keypads) or the associated data. Someone observing entry of the location information by the user cannot readily determine the user's password only from keyboard entries or observation of the screen alone since the location of the icons is preferably randomized.

The data is also protected during communication between the client subsystem and server subsystem because the password or data is never transmitted—only location information for the selected icons that represent the password elements is transmitted. Thus, interception of such transmissions alone will not disclose the data. Additionally, the use of the icons associated with the alphanumeric or other elements of the password combats computational deciphering techniques that could be used on intercepted display images by visually encoding data such that visual inspection (or very advanced pattern recognition) techniques are required in order to determine password or data elements.

Accordingly, one object of the present invention is to provide a data entry system that is not easily susceptible to the over-the-shoulder problem (i.e., to password compromise by observation by a third party of the user's keyboard data entry).

Another object is to provide a data entry and transmission system that is not easily susceptible to interception by making it difficult to ascertain without visual inspection of the contents of displayed data in order to properly determine actual contents of the data.

Additional objects, advantages and novel features of the invention will be set forth in, and become apparent to those skilled in the art from the description which follows.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Preferred embodiments of a system built in accordance with the present invention will now be described with continued reference to the figures.

Figure 1:
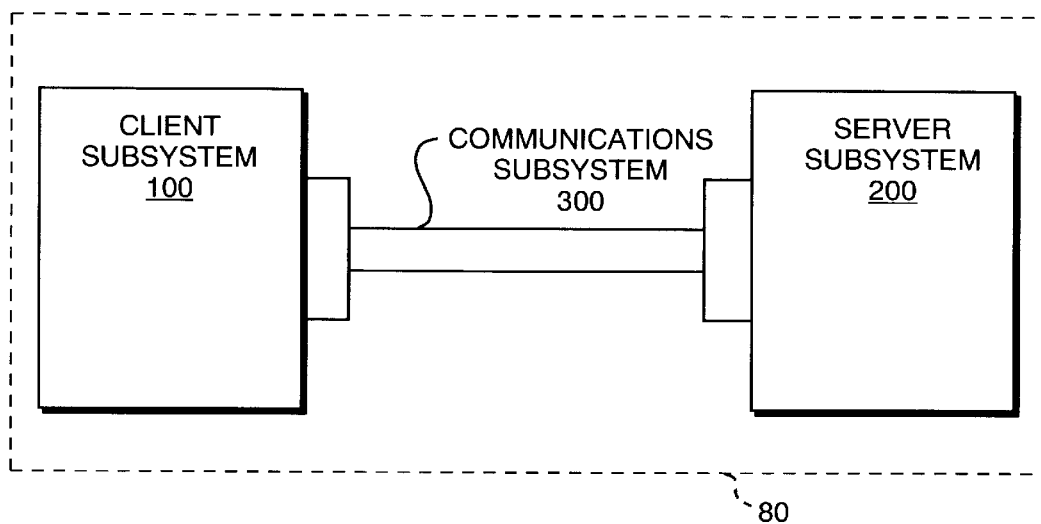
FIG. 1 is a system architecture block diagram of an exemplary system embodying the present invention.

FIG. 1 depicts a secure data entry and visual authentication system, generally indicated at 80, constructed in accordance with a first embodiment of the present invention. System 80 includes a client subsystem 100 with which a user interacts, and a server subsystem 200 which controls access to a resource the user wishes to access. Client subsystem 100 communicates with server subsystem 200 over communications subsystem 300.

Client subsystem 100 may take various forms such as a desktop or laptop computer, an ATM, a credit-card-operated telephone, a generic key entry pad with visual display capable of displaying icons, or any other such system that includes a display device and an input device for entering data.

Server subsystem 200 also can take numerous forms, including, for example, a file server with which PCs, personal digital assistants ("PDAs") or other devices can communicate. Another form server subsystem 200 may take is as a subsystem within an ATM or phone system or network. Other implementations are commonly known in the computer field.

The terms "client" and "server" as used herein are general and are not limited to so-called "client/server" systems. Thus, the system of the present invention may include any two communicating computers where at least one such computer controls a resource, such as might be implemented in a peer-to-peer system architecture.

Communications subsystem 300 may be implemented with one or more of many data communications systems generally known in the art, as may be suitable, such as a LAN, a WAN, plain old telephone service ("POTS"), cable systems, wireless systems such as cellular, satellite and personal communications services ("PCS") systems, or by a dedicated connection.

Figure 2:
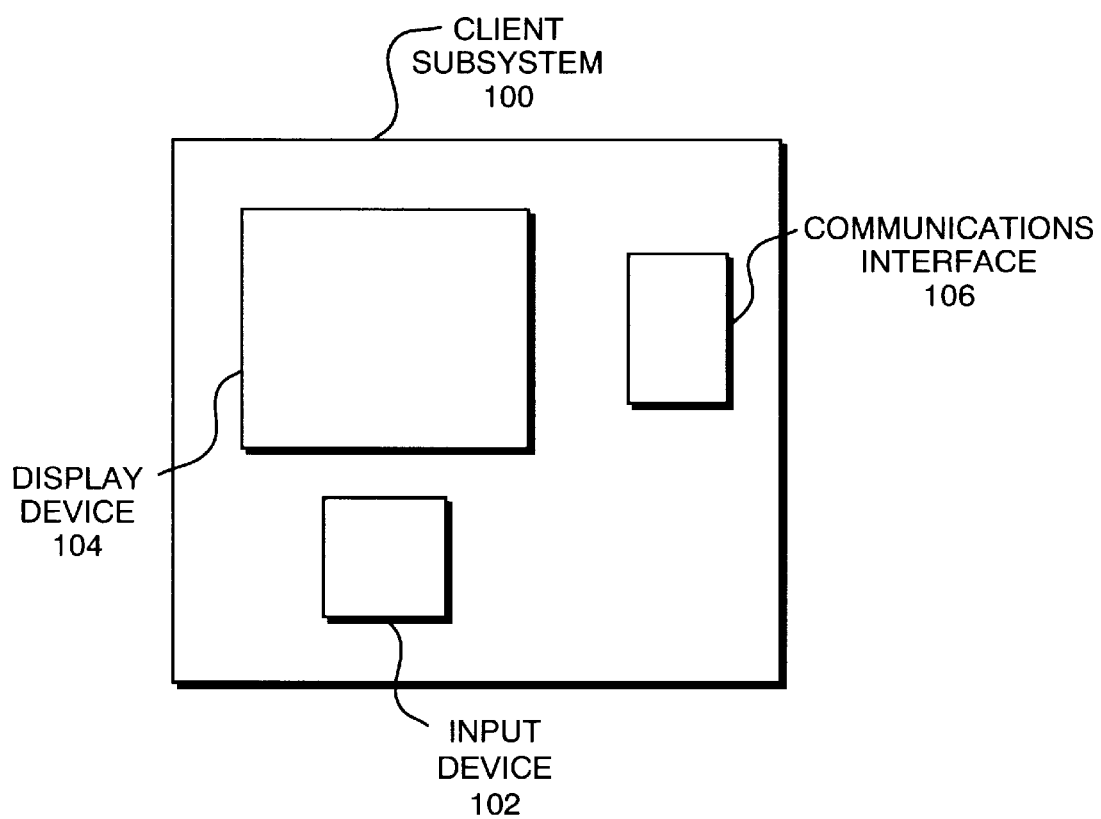
FIG. 2 is a block diagram depicting an exemplary client subsystem embodying the present invention.

Referring additionally to FIG. 2, it is seen that client subsystem 100 may include an input device 102, a display device 104 and an appropriate communications interface 106 which allows input data from input device 102 to be transmitted to server subsystem 200 depicted in FIG. 1. In this form, communications interface 106 might comprise a modem, network adapter or radio transmitter/receiver, or other such communications device, along with appropriate software.

Display device 104 may be any type of display capable of displaying various icons, such as a computer monitor including a cathode ray tube, flat panel displays incorporating liquid crystal ("LCD"), thin film transistor ("TFT") field emission display ("FED") or other display technology, and may comprise a touch-sensitive screen, or other technology. Input device 102 may be a pointing device such as a computer mouse, a light pen or other type stylus arrangement, a touch-sensitive screen, a computer keyboard or a keypad, or other such entry system that allows locations on display device 104 to be indicated.

Figure 3:
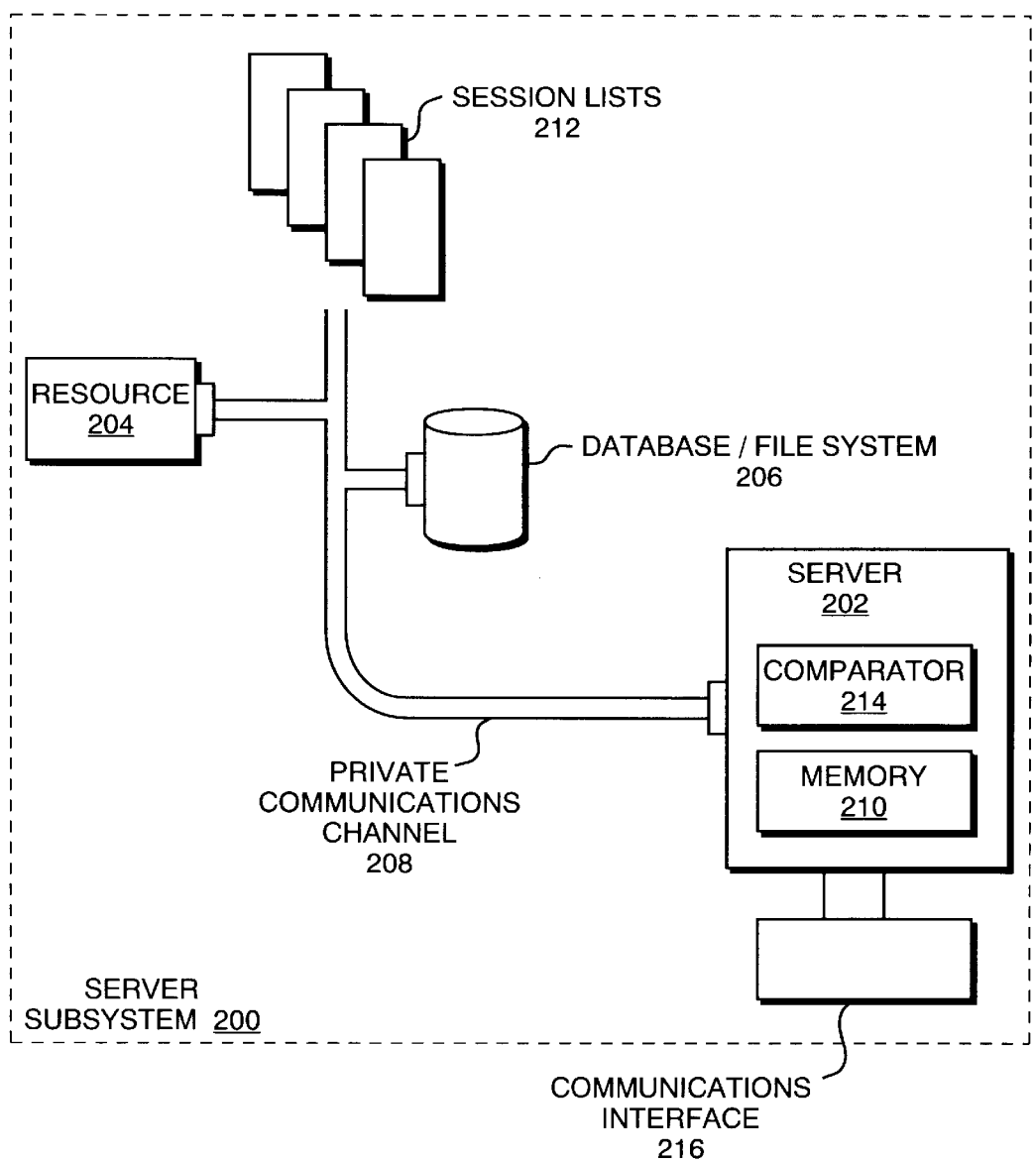
FIG. 3 is a block diagram depicting an exemplary subsystem of the present invention.

Referring now additionally to FIG. 3, it is seen that server subsystem 200 preferably includes a server 202 which may control access, for example, to a resource 204, a database or file system 206, or a private communication channel 208. Server 202 also includes a memory 210, a comparator 214 and a communications interface 216 such as a modem or network adapter with appropriate software drivers that allows communication with client subsystem 100 (FIG. 1) over communications subsystem 300 (FIG. 2).

Generally speaking, when a user desires to gain access to the server subsystem 200 or to specific resources controlled thereby, the user must identify herself to the server subsystem 200 and enter an appropriate password to gain entry. In the usual situation, the password is in alphanumeric format and includes a sequence of several letters and/or numbers unique to that particular user. Any form of element may be used as a password element, such as for example numbers and letters, symbols, images and the like. If a third party observes entry of the password by the user, or intercepts transmission of the password, and is able to decipher and learn the password, such third party may gain access to the server subsystem 200 under that user's name. Additionally, if the data or password is intercepted during the process of transmission from the client subsystem 100 to the server subsystem 200 over communications subsystem 300, the data might be compromised.

In the present invention, the server subsystem 200 can receive data from the user, typically via a user interface on client subsystem 100, but without transmission of the data or password itself either from the server subsystem 200 to the client subsystem 100 or from the client subsystem 100 to the server subsystem 200. Moreover, entry of the data is done in a manner which enhances the security of that process.

Figure 4:
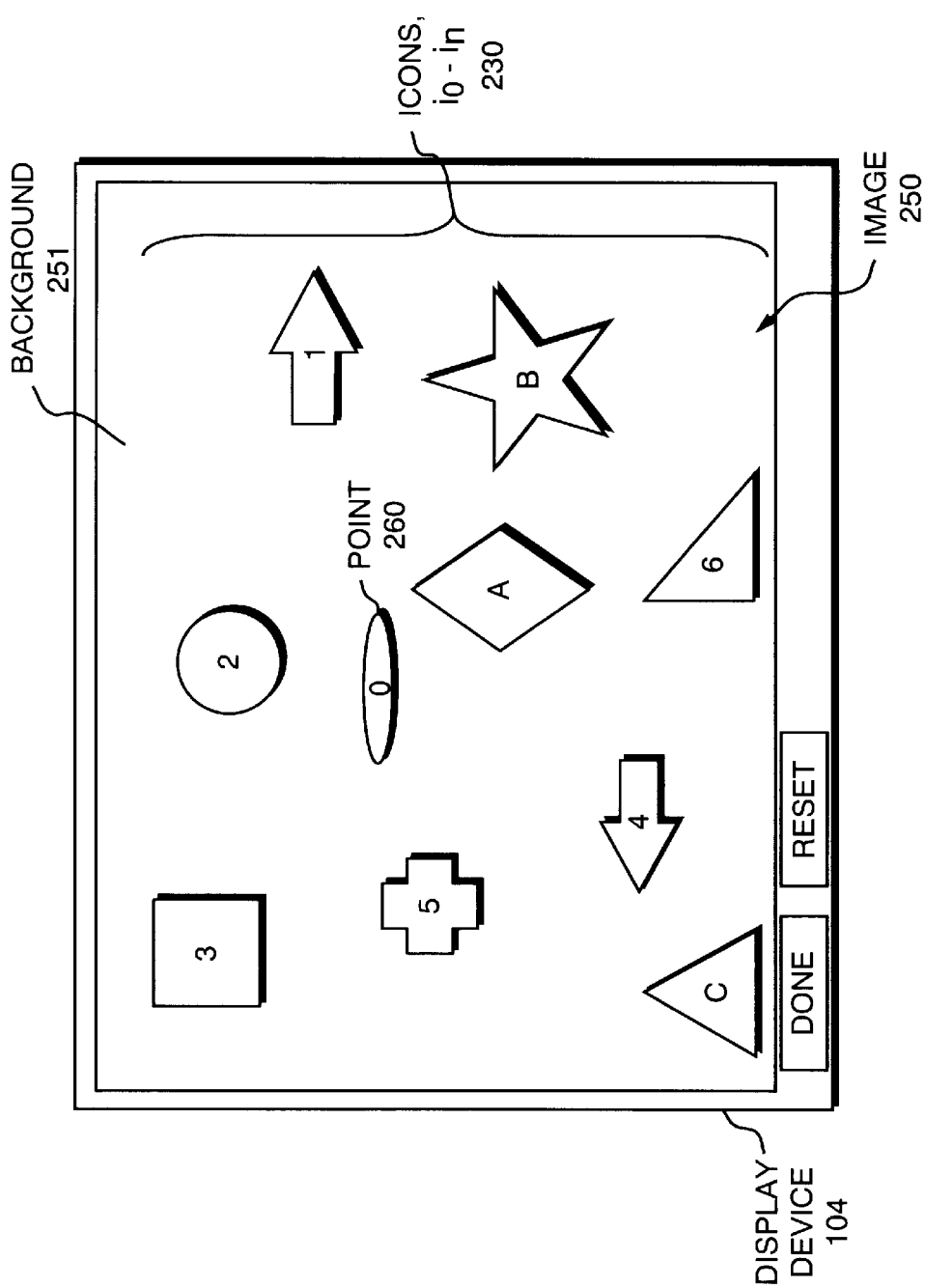
FIG. 4 is a front plan view of a client subsystem display showing the manner in which icons may be displayed thereon.
Figure 5:
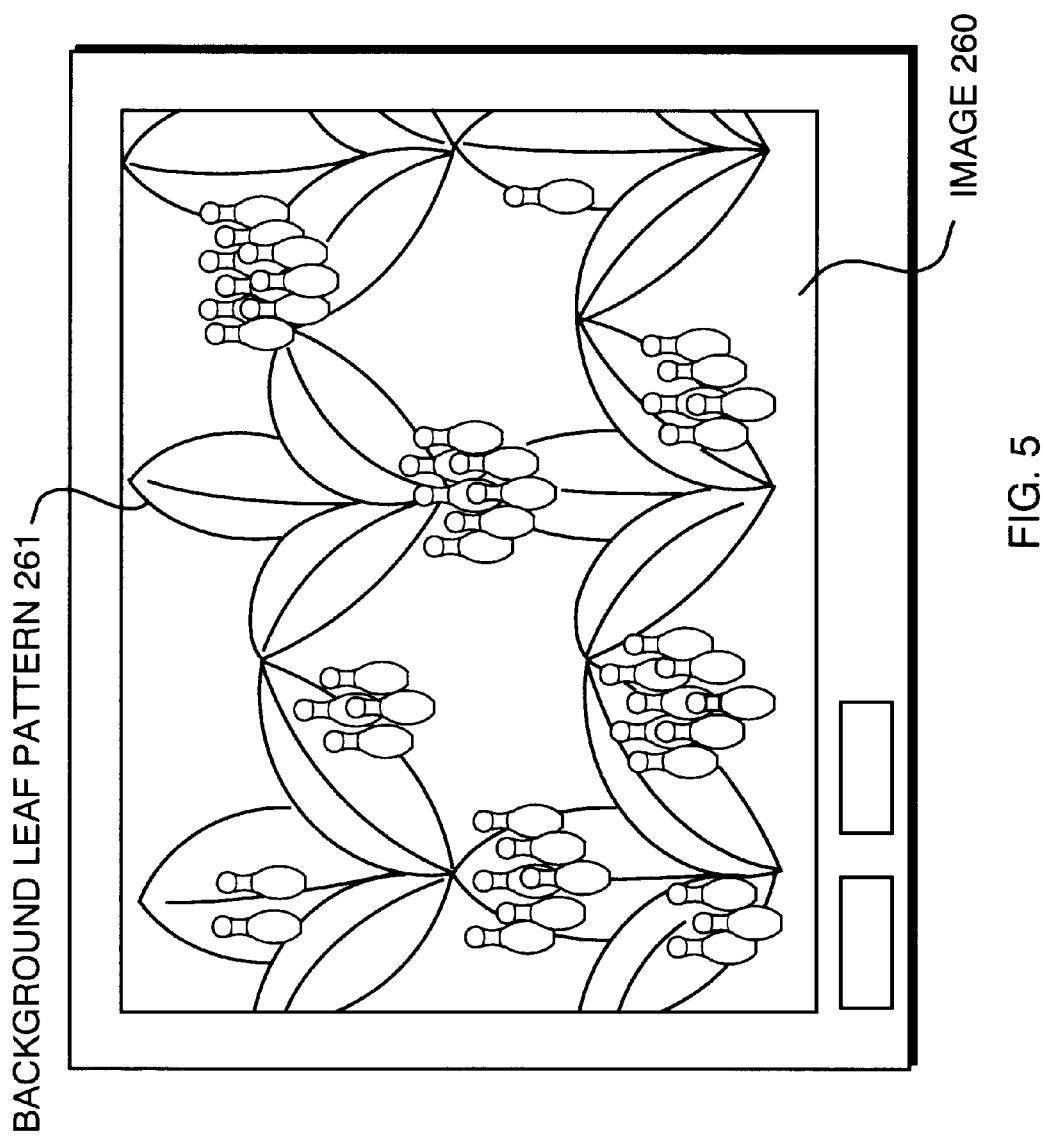
FIG. 5 is a front plan view of a client subsystem display showing the manner in which icons may be displayed using intuitive but indirectly identifiable indicia.
Figure 6:
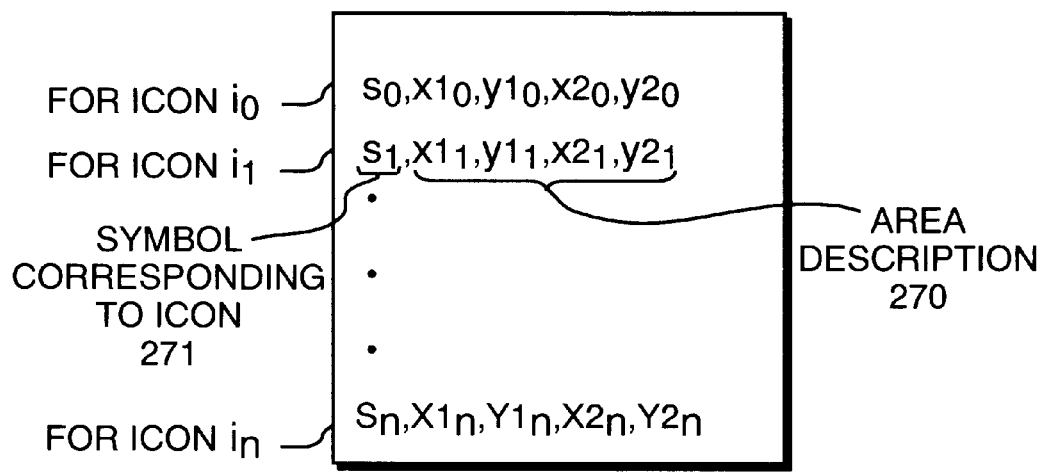
FIG. 6 is a block diagram showing a preferred manner in which icon location information is identified by the server.

Reference is now made additionally to FIGS. 4 through 6 for a description of the manner in which the present invention is preferably implemented and operated.

Preferably, when a user is identified to the server subsystem 200, the server subsystem 200 determines if the user is a recognized user. If so, the server subsystem 200 generates a display image 250, depicted in FIG. 4, bearing a group of icons $i_0$–$i_n$ 230, pseudorandomly arranged, arrayed or otherwise presented on the display device 104. Server 202 stores in memory 210 icon location information for each of the icons $i_0$–$i_n$ 230 such that the areas on the display image 250 that correspond to each of the icons $i_0$–$i_n$ 230 can be ascertained. Also stored in memory 210 is data associated with each of the icons $i_0$–$i_n$ 230. For example, if a particular display image 250 includes icons $i_0$–$i_n$ 230 corresponding to digits 0 to 9, memory 210 will have stored in it the digits such that the relationship of the icons, icon location information, and associated digits may be retrieved. A memory look up table can be used to store this information. Many other methods are known in the prior art.

Memory 210 may be implemented using random access memory ("RAM"), flash memory, disk drives or any other rewritable memory technology. In some applications, memory 210 may also be implemented using non-rewritable memory such as read only memory ("ROM") chips.

Server 202 may generate the display image 250 by selecting, pseudorandomly, based on prior user selections, or otherwise, said icons $i_0$–$i_n$ 230 included in said display image 250. The background 251 for the display image 250 might be plain or contain one or more patterns in one or more combinations of colors. Alternatively, display image 250 might be pre-generated and stored in files or a database system. Other methods of generating display image 250 are known in the prior act. Display image 250 may be implemented as a bit mapped image, a raster image or in any other suitable image file format.

Display image 250 may also include keypad digits corresponding to each of the icons $i_0$–$i_n$ 230. The user inputs the keypad digit k corresponding to the icon $i_x$ desired. To improve the security of the overall system, the arrangement of the icons $i_0$–$i_n$ 230 in the generated display image 250 is preferably pseudorandomly varied with each server access request. In addition, the particular icon scheme presented in display image 250 may be varied with each use, such icons preferably being randomly displayed rather than arranged.

Each icon $i_0$–$i_n$ 230 may be a polygon, an image of some object, or any other form from which users can identify relevant data elements. The icon serves as an identifiable indicator of an element of the data or password to be entered. For example, icons in the form of different fruit may be displayed where a user's password consists of several fruit images. Other such non-alphanumeric, symbolic passwords may also be used.

Icons may also take intuitive forms from which the user can readily deduce the data element represented by the icon. FIG. 5 shows a display image 260 depicting icons representing digits 0 through 9 by images of groups of bowling pins. The number of pins within each icon serve as identifiable indicia to the user of the digit it represents. In an application implemented with a touch screen, the user would touch the screen where the icon for the desired digit is located in order to input that digit.

FIG. 6 shows a session list of icons placed in a display image. The server subsystem 200 preferably stores the location of each of the icons in a session list or look-up table in memory, such as a list 211, and transmits the display image 250 or display image 260, which may also include a background pattern 251 (FIG. 4) or background pattern 261 (FIG. 5), for display on device 104. The background patterns 251 and 261 make it more difficult for a third party to observe the icons from a distance, e.g. by peering over the user's head. Additionally, the background leaf pattern 261 may provide false edges in order to make it more difficult for pattern recognition algorithms that a party that intercepts the display image 260 to determine the significance of the icons.

As an alternative to the server subsystem 200 generating the display image 250 or display image 260, the server subsystem 200 could provide instructions to the client subsystem 100 to generate and display such images. Display image 250 and display image 260 may be random and different each time they are displayed so that a new image is generated for each attempted access in a password or data entry mode.

FIG. 6 further depicts a manner in which the icon location information can be stored by the server subsystem 200 such that for a particular symbol 271 corresponding to an icon $i_x$ 230, area descriptions 270 are provided to indicate the location thereof. For example, symbols $s_0$, $s_1$, $s_2$ ... $s_n$ are associated with icons $i_0$–$i_n$ 230. An area is associated with each icon $i_x$ 230 as the area that the icon $i_x$ 230 covers. That area is specified, for example, for a rectangular area with the specification of the top-left and bottom-right points, or the top-left point and the width and height of the rectangular area. A circular area might be specified with a center-point and a radius value. Other area specifications for more complex shapes are possible. Additionally, only one point might be stored for each icon, and a minimum distance to closest icon method, or other algorithm, might be used to ascertain the selected icon $i_x$ 230.

Each icon $i_x$ 230 will have a different set of coordinates defining its particular location on the display image to define area description 270. Points within the selected icon $i_x$ 230 on the display locations can be identified by the user through an appropriate input device—such as a computer mouse, pointer, keyboard or the like.

In order to enter the user's password or other data in accordance with the present invention, the appropriate icons $i_0$–$i_n$ 230 corresponding to the elements of the password are selected in order by the user, and this location information is communicated to the server subsystem 200. In a data entry situation, the server subsystem 200 utilizes a comparator 214 to compare the selected points to the icons $i_0$–$i_n$ 230 from which they were selected and converts this to the entered data. In a password entry situation, comparator 214 (shown in FIG. 3) in server subsystem 200 compares the order of the points selected by the user to the icon location information which represents the user password elements in the memorized order to determine whether they correspond to each other. If so, the user will be allowed appropriate access to the server subsystem 200.

Comparator 214 may be implemented in server subsystem 200 in software using techniques known in the prior art. Other methods of implementing the comparator are also commonly known in the prior art.

Suppose, for example, that the user's PIN is "5263". When the user identifies herself to the server subsystem 200, the server subsystem 200 generates a random display image 250 as depicted in FIG. 4 containing a generic background pattern 251 or background leaf pattern 261, and a series of shaped icons $i_0$–$i_n$ 230 each containing an individual alphanumeric indication. Alternatively, the server subsystem 200 could look up the user's password and generate a series of icons $i_0$–$i_n$ 230 at least including the password or PIN elements. The icons' locations and features may be generated pseudorandomly, according to a set scheme or obtained from a file, look up table, database or otherwise generated.

As depicted in FIG. 4, the icon shapes may, in one embodiment, be geometric, such as the depicted square, circle, diamond, triangle, and the like, but other non-regular shapes may be utilized. Also, the password may be other than alphanumeric such as fruits, vehicles, animals or other objects. The password may alternatively comprise a series of themes or ideas, such as "hot," "cold," "fear," etc. The icons to such system would comprise images relating to such concepts.

The server subsystem 200 generates the display image 250 depicted in FIG. 4 and transmits that image for display to the user on display device 104. The client subsystem may not know the makeup of the display image 250, but rather may only display that image. The user then selects her PIN or password by identifying in order the particular icons containing the alphanumeric characters containing PIN or password elements. The user selects these, for example, by pointing and clicking through a mouse, or other such pointing device. Alternatively, moving a cursor by means of a keyboard and the entering of each successive image point location in order may be used. Other selection or indication devices and methods may also be used.

Figure 7:
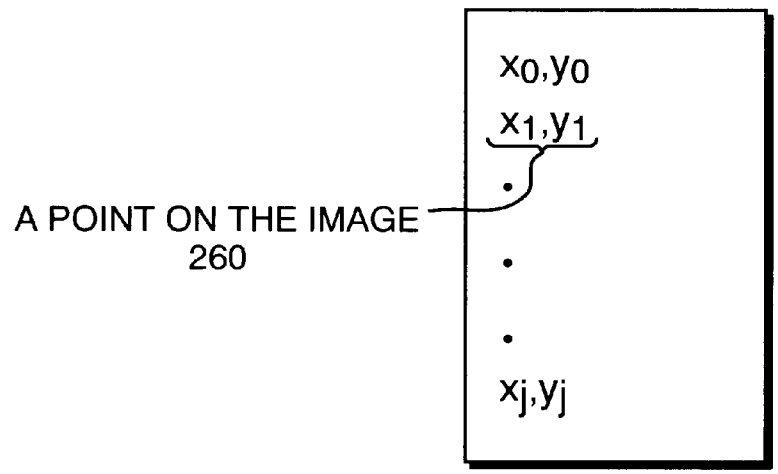
FIG. 7 is a block diagram showing a preferred manner in which icon location information is identified by a user.

With the user's PIN of "5263," the user would point to and click first the cross, then the circle, then the right triangle and then the square. This will act to select a point in each icon 230 in the form of location information. This location information is then transmitted or communicated to the server in the form, for example, of particular points in the icon 230 such as those listed in the session list 212 in FIG. 7. The server subsystem 200 would compare the selected point locations against the transmitted image locations and determine whether the points correspond to icon locations which indicate the appropriate PIN or password information. If so, the user will be allowed access to the server, as appropriate.

At another session when the same user attempts to sign on and identifies herself to the server subsystem 200, it will generate perhaps another series of icons in a different random pattern on the display, preferably with a different background, and preferably different icon shapes. This will be remembered by the server as a different session list or look-up table. The user will be required to enter the appropriate icon locations that correspond to the password. In this fashion, the actual data or password is neither transmitted from the server to the client, nor from the client to the server.

Figure 8:
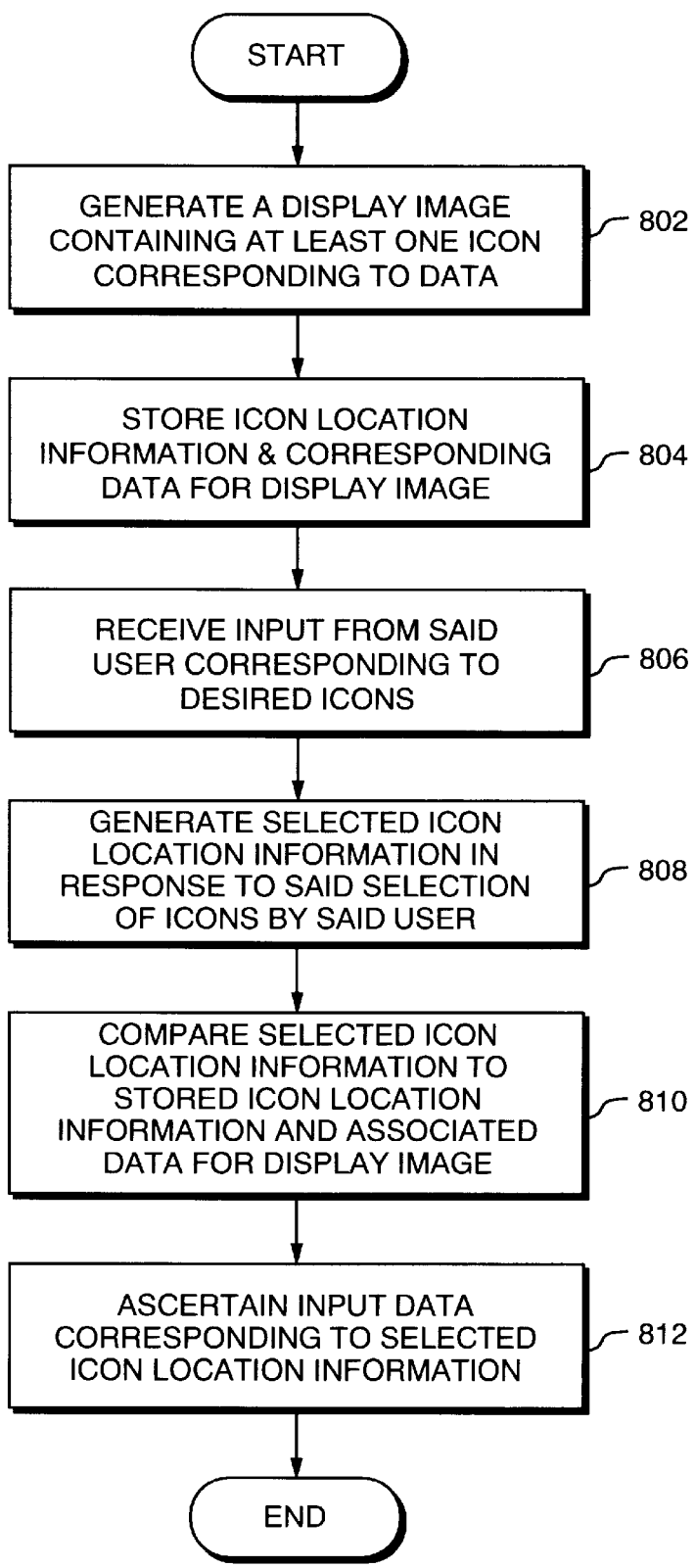
FIG. 8 is a flow diagram showing a preferred method implemented according to the present invention.

FIG. 8 shows a flow diagram of a method according to a preferable embodiment of the present invention. In step 802, a display image is generated by a server subsystem containing at least one icon, at least one of which corresponds to relevant data, after a user requests access to a resource. Icon location information and associated data for the generated display image is then stored by the server subsystem in a memory in step 804.

The display image of icons is then transmitted to a client subsystem for display to a user, and the client subsystem receives input from the user indicating the desired icons corresponding to the user's input data in step 806.

The client subsystem then generates selected icon location information in response to said selection of icons by the user in step 808.

The selected icon location information is then transmitted to the server subsystem, which compares said selected icon location information to the stored icon location information and associated data stored for that display image in step 810. Finally, in step 812 the input data entered by the user into the client subsystem is ascertained by the server subsystem by determining the data corresponding to the selected icon location information.

The present invention is flexibly implementable in many and varied circumstances, including for secure entry of credit card information in online shopping applications, for credit-card-operated phones and for applications implemented using smart card technology.

Figure 9:
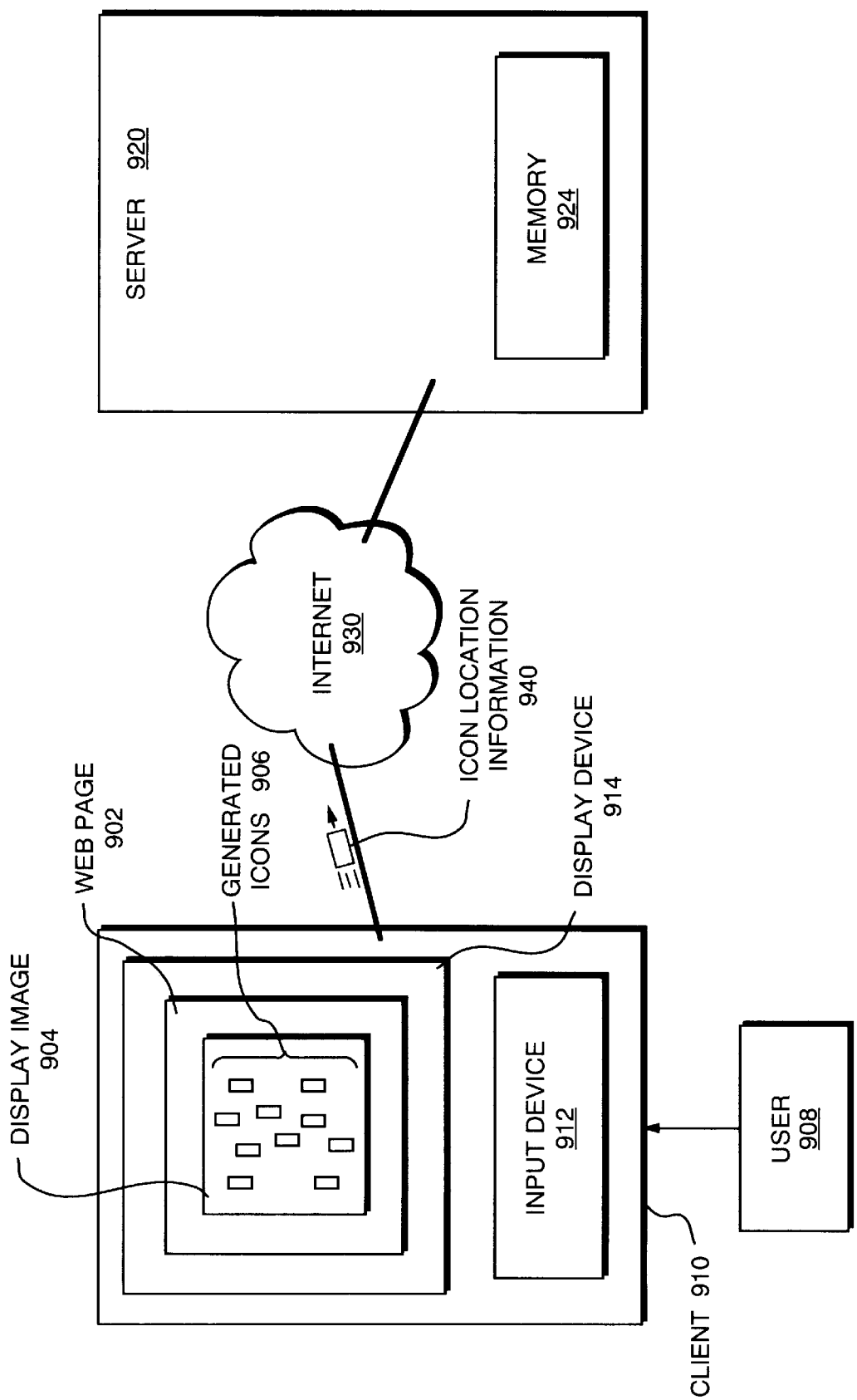
FIG. 9 is a block diagram of an exemplary preferred embodiment of an online shopping application.
Figure 10:
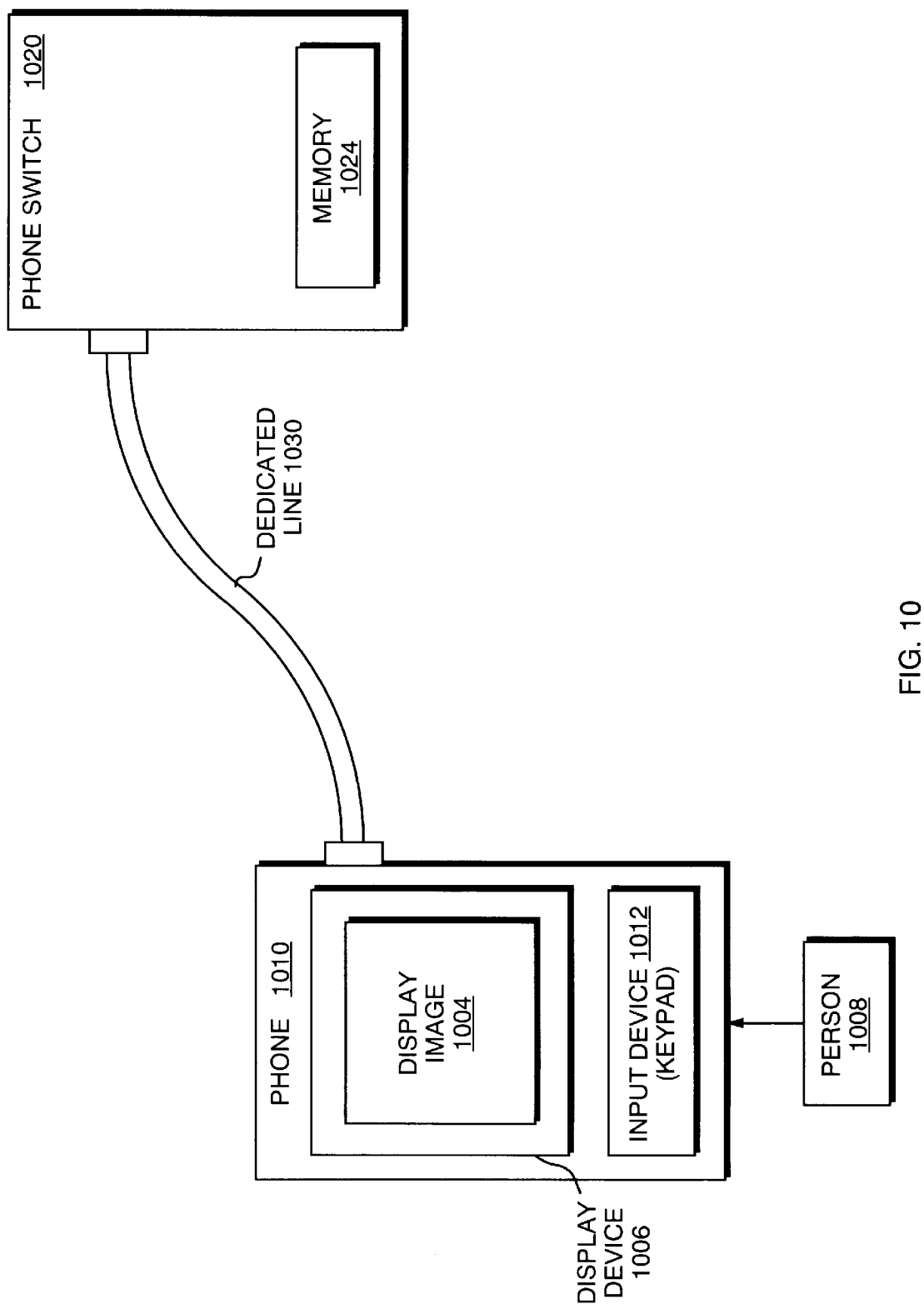
FIG. 10 is a block diagram of an exemplary preferred embodiment of a credit-card-operated phone system.
Figure 11:
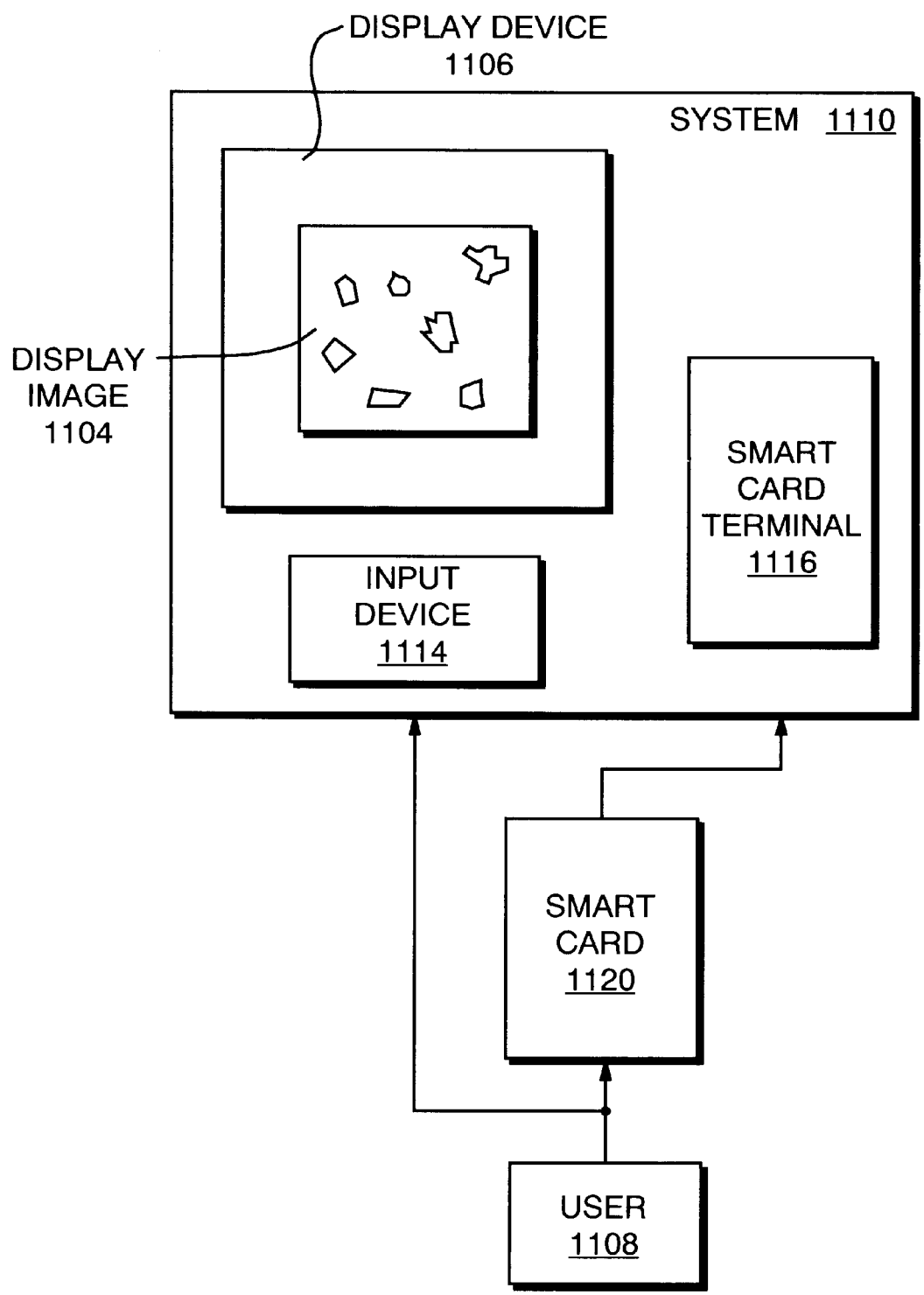
FIG. 11 is a block diagram of an exemplary preferred embodiment of a smart-card-based implementation of the present invention.

Reference is made to FIGS. 9, 10 and 11. FIG. 9 is a block diagram of an online shopping application on the World Wide Web in which credit cards are used to make purchases. A Web page 802 is generated on display device 914 on client 910. The Web page incorporates a display image 904 containing pseudorandomly generated icons 906. The display image 904 may be transmitted by server 920 over the Internet 930 along with the Web page 902, or server 920 might send instructions to client 910 to generate an image. To enter a credit card number, the user 908 selects the desired icons 230 corresponding to the digits of the user's credit card number by means of input device 912. Client 910 transmits the icon location information 940 to server 920 over the Internet 930. Server 920 compares the icon location information 940 to information stored in memory 924 to ascertain the credit card data entered by user 908. Server 920 can then confirm the credit card information through normal credit card verification processes.

FIG. 10 shows a credit-card-operated phone. A person desiring to use phone 1010 would input the user's credit card information using keypad 1012 depending on the desired icons in display image 1004 on display device 1006 representing said credit card data. The display image 1004 may, as in the Web page example, be generated by the phone 1010 or generated and transmitted by the phone switch 1020 over, in this embodiment, dedicated line 1030. Where the image is generated by the phone switch 1020, icon location information would then be sent by phone 1010 over dedicated line 1030 to phone switch 1020, which compares the received icon location information to information stored in phone switch memory 1024 to ascertain the credit card data. The credit card data is then used to authorize the charge of the phone call using normal credit card authorization processes.

FIG. 11 shows an embodiment of the present invention using smart card technology. User 1108 inserts smart card 1120 into the smart card terminal 1116 of system 1110. The display device 1106 displays a display image 1104 generated by smart card 1120. User 1108 then inputs, using input device 1114, information corresponding to the icons that represent the desired data input. If properly authenticated, the user could, for example, be granted access to a local resource.

Figure 12:
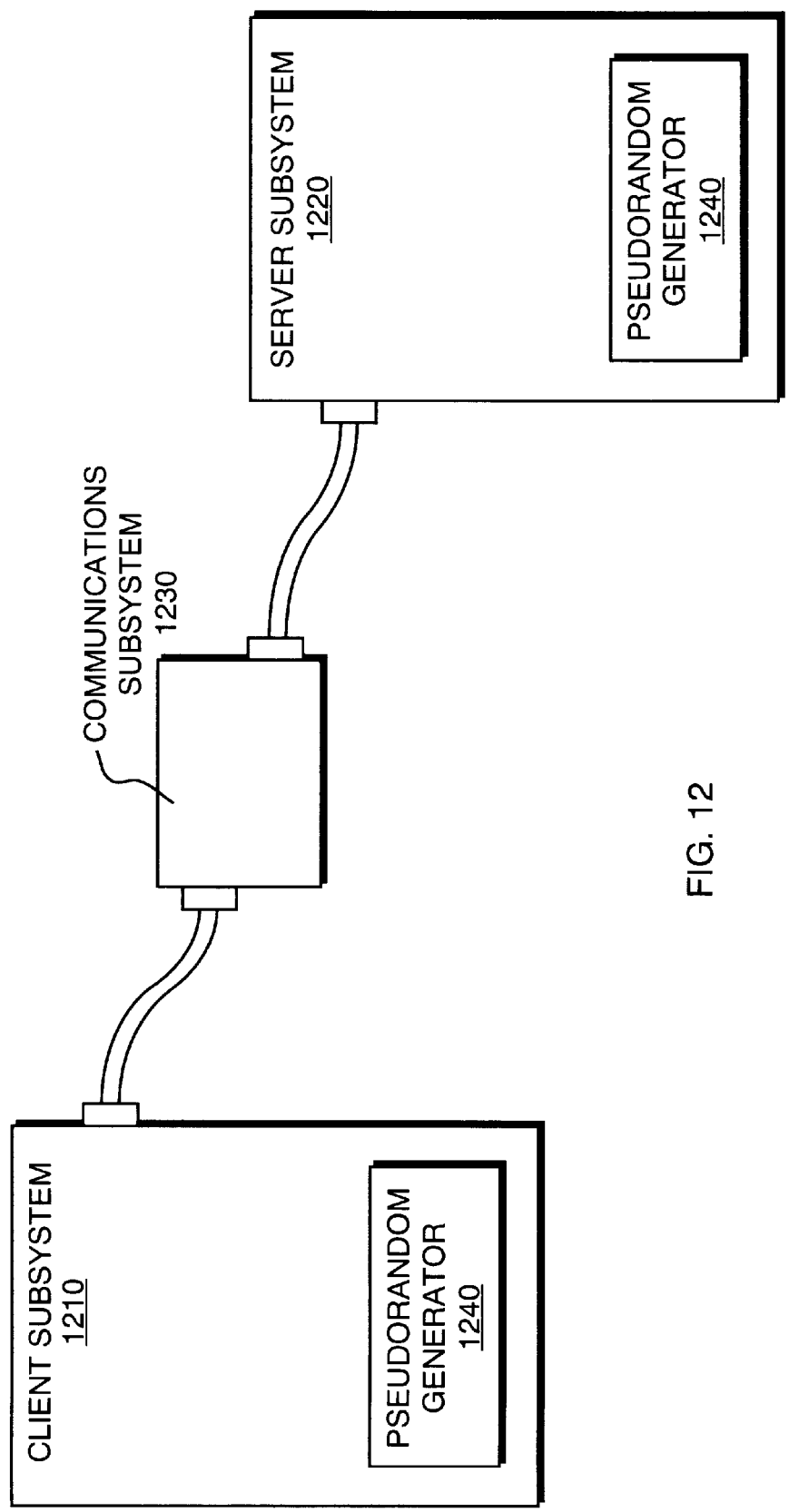
FIG. 12 is a block diagram of an exemplary embodiment of the present invention incorporating a synchronization mechanism between the client subsystem and the server subsystem.

An additional enhancement to the present invention can be obtained by implementing a synchronization mechanism such that a display image need not be transmitted between the client and server. One way to implement such a synchronization is to implement pseudorandom number generators in both the client subsystem and server subsystem with both pseudorandom number generators beginning with the same seed. FIG. 12 is a block diagram of an embodiment of the present invention that includes the use of pseudorandom number generators. Each of the client subsystem 1210 and the server subsystem 1220 contain a pseudorandom number generator 1240. By using the pseudorandom number generators 1240, the client subsystem 1210 and the server subsystem 1220 can minimize the amount of information transmitted over communications subsystem 1230. Server subsystem 1220, instead of transmitting an image or sending instructions about an image to be generated (including information about the icons and the data corresponding thereto) to the client subsystem, may send only information about which passes through a pseudorandom number generator function will be used to determine icon location information in a display image to be generated. The client subsystem 1210 and the server subsystem 1220 are preferably synchronized by having preset a particular seed associated with each user. The pseudorandom number generator 1240 will generate the same number every time for a particular pass through the pseudorandom number generator 1240 if the same seed is used, the client subsystem 1210 and the server subsystem 1220 can exploit this characteristic to remain synchronized on every pass.

Part of the advantage provided by the present invention lies in the fact that the visual authentication system is used for secure data entry since recognized ordered transmission and recognition is required. For example, if the icons generated on the display comprise all ten (10) numeric digits from zero through nine, a user might safely enter and transmit his credit card number without actually transmitting the digits themselves, but rather the location information of points in icons corresponding to the digits. Even if this transmission is intercepted, the intercepted information will comprise a location rather than digits so that the interceptor will not learn the user's credit card number. It is noted that encryption techniques may be used to further confound an interceptor even as to the location information.

The invention also incorporates the use of intuitive icons, which assist in confounding computational deciphering techniques. In accordance with the foregoing, the authentication and data entry system of the present invention achieves numerous benefits and advantages. In particular, since the password or data is never itself transmitted, it cannot be intercepted and detected. Moreover, since the password or data entry actions are different each time, the password, credit card information or other data cannot be deduced by an onlooker merely from observation of the user's hands.

The probability of a random guess of a password being correct in a traditional system is 1/(size of alphabet) raised to the power of the number of symbols in the password. For example, with an alphabet of size 10, such as the digits 0 through 9, and a password string of 5 digits, a standard password scheme would give a probability of success of $1/10^5$ or $1/100,000$. Using the system and method of the present invention, the probability of successful guessing at a password is $(1/100)^5$ or +e,fra 1/10,000,000,000+ee , assuming a 30×30 icon area and a 300×300 image area.

If an encryption scheme is utilized in connection with the present invention and in addition to the present invention, the system is even more secure, and deciphering the encryption will only result in location information, rather than the password or data itself.

The present invention may be used in conjunction with LANs and WANs, secure Internet Web sites, ATM machines, automobile security systems, home security systems, safes and vaults, data encryption and decryption key entry, and other data entry applications. In this regard, it is noted that the references to server side and client side herein do not require a direct communication therebetween. A computer acting as a server could transmit the image to an intermediate computer which could then transmit the image to another computer where the user enters data through the image. Such input is then sent to the intermediate computer and then to the first computer for verification.

It is also noted that the references to server and client also cover a peer-to-peer situation where one computer is used to access or communicate with another. In another situation the image could be generated and stored in a hand-held unit or other such device, and used to enter secure data when in communication, such as through a telephone network, with a source which recognizes the image entries. Additionally, it could be used on page phones or other restricted access phones.

It will thus be seen that the objects set forth above, among those made apparent from the preceding description, are efficiently attained and, since certain changes may be made in carrying out the above methods and in the systems set forth without departing from the spirit and scope of the invention, it is intended that all matter contained in the above description and shown in the accompanying drawings shall be interpreted as illustrative and not in a limiting sense.

What is claimed is:

1. A secure data entry system for entering data into a computer-based system, comprising:
    a server subsystem adapted for generating display image information for a display image, said display image containing a plurality of icons, at least one of said plurality of icons being associated with corresponding icon location information within said display image and with data, said server subsystem including means for processing said display image information, means for storing said icon location information and said associated data for said display image, means for comparing said icon location information with selected icon location information associated with input data, and means for varying the icon location information for display images generated;
    a client subsystem adapted for generating said display image from said display image information, said client subsystem including means for generating said display image, means for displaying said display image, and means for receiving input data from a user, including selection by said user of at least one of said plurality of icons within said display image; and
    means for communicating said display image information from said server subsystem to said client subsystem and icon location information for said selected at least one icon from said client subsystem to said server subsystem; said server subsystem comparing said selected icon location information to said stored icon location information and associated data for said display image in said server subsystem.

2. The secure data entry system as claimed in claim 1, wherein said user selects said at least one of the plurality of icons by selecting at least one point location in said display image corresponding to said at least one icon.

3. The secure data entry system as claimed in claim 1, wherein said plurality of icons are pseudorandomly arranged in said display image.

4. The secure data entry system as claimed in claim 1, wherein said input data comprises password information.

5. The secure data entry system as claimed in claim 1, wherein said plurality of icons comprises random shapes and sizes.

6. The secure data entry system as claimed in claim 1, wherein said plurality of icons represents concepts.

7. The secure data entry system as claimed in claim 1, wherein at least one of said plurality of icons includes at least one alphanumeric indicia.

8. The secure data entry system as claimed in claim 1, wherein said display image information comprises said display image and said means for generating a display image in said client subsystem comprising functionality for receiving said display image and delivering it in proper format to said means for displaying said display image.

9. The secure data entry system as claimed in claim 1, wherein said display image information comprises icon location information.

10. The secure data entry system as claimed in claim 1, wherein said display image information comprises instructions for the generation of said display image.

11. The secure data entry system as claimed in claim 1, wherein said icons are preselected by said user and stored in said server subsystem.

12. The secure data entry system as claimed in claim 1, wherein said server subsystem comprises a first computer subsystem and said client subsystem comprises a second computer subsystem.

13. A secure data entry system for entering data into a computer-based system, comprising:
    a first computer-based subsystem adapted for generating display image information for a display image, each said display image containing a plurality of icons, at least one of said plurality of icons being associated with corresponding icon location information within said display image and with data, said first computer-based subsystem including a memory capable of storing said icon location information and said associated data for said display image, and further adapted for comparing said icon location information with location information associated with said input data and for varying the icon location information for display images generated;
    a second computer-based subsystem adapted for generating said display image from said display image information, for displaying said display image, and for receiving input data from a user, said input data including selection by said user of at least one icon from said plurality of icons within said display image; and a communications subsystem for communicating said display image information from said first computer-based subsystem to said second computer-based subsystem and icon location information for said selected at least one icon from said second computer-based subsystem to said first computer-based subsystem; said first computer-based subsystem comparing said selected icon location information to said stored icon location information and associated data for said display image.

14. A secure data entry system for entering input data into a computer-based system, said data entry system comprising:

a first computer-based subsystem adapted for generating icon location information for a display image, said icon location information for said display image associated with at least one of a plurality of icons contained in said display image, and further associated with data, said first computer-based subsystem being further adapted for storing said icon location information and associated data for said display image, and for varying the icon location information for display images generated;

a second computer-based subsystem adapted for generating said display image from said icon location information, for displaying said display image and for receiving input data from a user, including selection of at least one icon from said display image; and a communications subsystem for communicating said icon location information from said first computer-based subsystem to said second computer-based subsystem, and icon location information for said selected at least one icon from said second computer-based subsystem to said first computer-based subsystem, said first computer-based subsystem comparing said selected icon location information to said stored icon location information and associated data.

15. The secure data entry system as claimed in claim 14, further comprising an image synchronization mechanism for synchronizing said icon location information between said first computer-based subsystem and said second computer-based subsystem.

16. The secure data entry system as claimed in claim 15, wherein said image synchronization mechanism is comprised of pseudorandom number generators in each of said first computer-based subsystem and said second computer-based subsystem.

17. A server subsystem for a secure data entry system, said server subsystem comprising:

means for generating display image information for a display image, said display image containing a plurality of icons, at least one of said plurality of icons being associated with corresponding icon location information within said display image, and further associated with data;

means for storing said icon location information and said associated data for said display image;

means for comparing said stored icon location information with selected icon location information received from a client subsystem by means of a commmunications subsystem, said selected icon location information reflecting selection of at least one icon from said display image by a user through said client subsystem, and said communications subsystem transmitting said display image information from said server subsystem to said client subsystem, and said selected icon location information from said client subsystem to said server subsystem for comparison with said stored icon location information and associated data for said display image; and means for varying the icon location information for display images generated.

18. A client subsystem for a secure data entry system, said client subsystem comprising:

means for generating display images from display image information received from a server subsystem for each said display image, each said display image containing a plurality of icons, at least one of said plurality of icons being associated with corresponding icon location information within said display image and further associated with data, said server subsystem varying the icon location information for display images generated;

means for displaying said display image;

means for receiving input data from a user, including selection by said user of at least one of said plurality of icons within said display image; and means for transmitting over a communications subsystem said selected icon location information to said server subsystem, for comparison with said at least one icon associated with corresponding icon location information and associated data for said display.

19. A communications subsystem for a secure data entry system, comprising:

means for communicating display image information for display images from a server subsystem to a client subsystem, and for communicating selected icon location information from said client subsystem to said server subsystem;

each said display image containing a plurality of icons, at least one of said plurality of icons being associated with corresponding icon location information within said display image and further associated with data;

said client subsystem generating said display image from said display image information, displaying said display image, receiving input from a user, including selection by said user of at least one icon from said plurality of icons within said display image; and said server subsystem comparing said selected icon location information with said icon location information and data associated with said display image, and varying the icon location information for display images generated.

20. A method for entering data into a secure data entry system for a computer-based system, comprising:

(a) generating a display image, said display image containing a plurality of icons;

(b) associating at least one of said plurality of icons with corresponding icon location information within said display image, and with data;

(c) displaying said display image;

(d) receiving input data from a user reflecting said user's selection of at least one icon from said plurality of icons in said display image;

(e) comparing said selected icon location information to said associated icon location information and associated data for said display image; and (f) repeating steps (a) through (e) for a plurality of display images and at least one user, wherein the icon location information associated with said plurality of icons is varied for display images generated;

wherein at least one of the steps of the method is performed in a server subsystem of the computer-based system and the other steps are performed in a client subsystem of the computer-based system, said server subsystem and said client subsystem communicating by means of a communications subsystem.

21. A method for entering input data into a server subsystem of a secure data entry system, comprising:
    (a) generating display image information for a display image, said display image containing a plurality of icons;
    (b) associating at least one of said plurality of icons with corresponding icon location information within said display image, and with data;
    (c) receiving from a client subsystem, by means of a communications subsystem, icon location information reflecting selection by a user of at least one of said plurality of icons;
    (d) comparing said selected icon location information to said associated icon location information and associated data for said display image; and
    (e) repeating steps (a) through (d) for any user, wherein the icon location information associated with said at least one icon is varied for display images generated.

22. The method of claim 21, wherein steps (a), (b) and (d) are performed in a server subsystem of a secure data entry system, step (c) is performed in a client subsystem of a secure data entry system, said display image information is transmitted from said server subsystem to said client subsystem, and said selected icon location information is transmitted from said client subsystem to said server subsystem for said comparison.

23. A method for entering data into a client subsystem of a secure data entry system, comprising:
    (a) receiving display image information for a display image from a server subsystem of said secure data entry system, said display image containing a plurality of icons, at least one of said plurality of icons being associated with corresponding icon location information within said display image and associated with data;
    (b) generating said display image;
    (c) displaying said display image;
    (d) receiving input data from a user, said input data reflecting said user's selection of at least one of said plurality of icons;
    (e) transmitting said selected icon location information corresponding to said selection by said user of at least one of said plurality of icons from said display image to said server subsystem for comparison with said associated icon location information and associated data for said display image; and
    (f) repeating steps (a) through (e) for any user, wherein the icon location information associated with said at least one icon is varied for display images generated.

24. A method for transmitting data in a communications subsystem of a secure data entry system, comprising:
    (a) receiving display image information for transmission, said display image information corresponding to a display image containing a plurality of icons, at least one of said plurality of icons having icon location information for said display image associated with it, and further associated with data;
    (b) transmitting said display image information;
    (c) receiving icon location information for at least one icon selected by a user from said plurality of icons within said display image; and
    (d) repeating steps (a) through (c), wherein the icon location information associated with said at least one of said plurality of icons is varied for display images generated.

25. The method of claim 24, wherein said display image of step (a) is received from a server subsystem of said secure data entry system, said display image is transmitted in step (b) to a client subsystem of said secure data entry system, and said selected icon location information in step (c) is received from said client subsystem, and transmitted to said server subsystem.

26. A method for entering password data into a computer-based system comprising:
    (a) receiving from a user a password and icon information for at least one icon corresponding to said password;
    (b) storing said password and said associated icon information;
    (c) generating display image information for a display image, said display image containing a plurality of icons, at least one of said plurality of icons corresponding to said password;
    (d) generating said display image;
    (e) displaying said display image;
    (f) receiving input data from a user, including identification information for that user and selection of at least one of said plurality of icons in said display image;
    (g) comparing said selected icon location information to said stored icon location information and said associated password data for said display image;
    (h) repeating steps (c) through (g) until all of the at least one icon associated with said password have been displayed to said user; and
    (i) repeating steps (c) through (h) for any user, wherein the icon location information associated with said at least one icon corresponding to said password is varied for display images generated;

wherein at least one of the steps of the method is performed in a server subsystem of the computer-based system and the other steps are performed in a client subsystem of the computer-based system, said server subsystem and said client subsystem communicating by means of a communications subsystem.

27. The method of claim 26, wherein said icon information comprises information for incorporation of said at least one icon corresponding to said password in display images.

28. A method for entering password data into a computer-based system comprising:
    (a) receiving from a client subsystem a password and icon information for at least one icon corresponding to that password;
    (b) storing said password and said icon information;
    (c) generating display image information for a display image, said display image containing a plurality of icons, said plurality of icons containing at least one of said at least one icon corresponding to said password;
    (d) generating said display image;
    (e) displaying said display image;
    (f) receiving input data from a user, including selection by said user of identification information for that user and selection of at least one of said plurality of icons in said display image;
    (g) generating selected icon location information corresponding to said selection of at least one icon from said display image by said user;
    (h) comparing said selected icon location information. to said stored icon information and said associated password;
    (i) repeating steps (c) through (h) until all of the at least one icon associated with said password have been displayed to said user; and (j) repeating steps (c) through (i) for a user, wherein the icon location information associated with said at least one icon corresponding to said password is varied for display images generated.

29. The method of claim 28 wherein at least one step is performed in a server subsystem of said secure data entry system and the remaining steps are performed in a client subsystem of said secure data entry system.

30. A method for entering password data into a server subsystem of a computer-based system comprising:

(a) receiving a password and icon information for at least one icon corresponding to that password for a user;

(b) storing said password and said icon information;

(c) generating display image information for a display image, said display image containing a plurality of icons, said plurality of icons containing at least one of said at least one icon corresponding to said password;

(d) transmitting said display image information to a client subsystem;

(e) receiving from said client subsystem input data for a user, including selected icon location information corresponding to selection by said user of at least one of said plurality of icons in said display image;

(f) comparing said selected icon location information to said stored icon information and said associated password;

(g) repeating steps (c) through (f) until all of the at least one icon associated with said password have been displayed to said user; and (h) repeating steps (c) through (g) for a user, wherein the icon location information associated with said at least one icon corresponding to said password is varied for display images generated.

31. A method for entering password data into a client subsystem of a computer-based system comprising:

(a) receiving a password and icon information for at least one icon corresponding to that password for a user;

(b) transmitting said password and said icon information to a server subsystem of said secure data entry system;

(c) receiving display image information for a display image, said display image containing a plurality of icons, said plurality of icons containing at least one of said at least one icon corresponding to said password;

(d) generating said display image from said display image information;

(e) receiving input data from a user, including selection by said user of at least one of said plurality of icons in said display image;

(f) transmitting selected icon location information to said server subsystem for comparison with stored icon information and said associated password;

(g) repeating steps (c) through (f) until all of the at least one icon associated with said password have been displayed to said user; and (h) repeating steps (c) through (g) for a user, wherein the icon location information associated with said at least one icon corresponding to said password is varied for display images generated.

\* \* \* \* \*